No. 880,726. PATENTED MAR. 3, 1908.
L. D. FLANARY.
LISTER FOR PLOWS.
APPLICATION FILED OCT. 31, 1907.
Fig. 1.
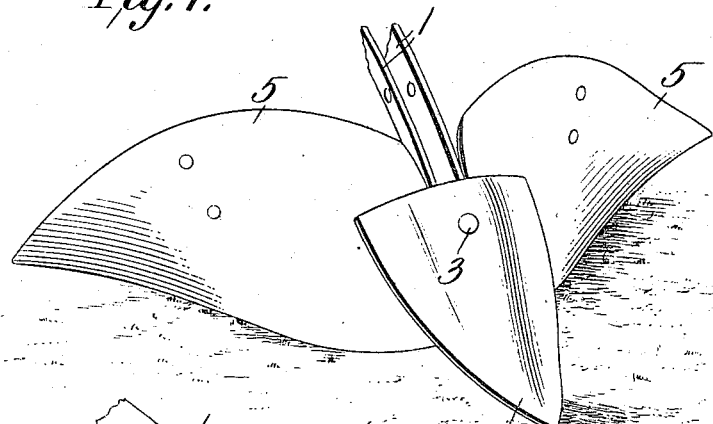
Fig. 2.
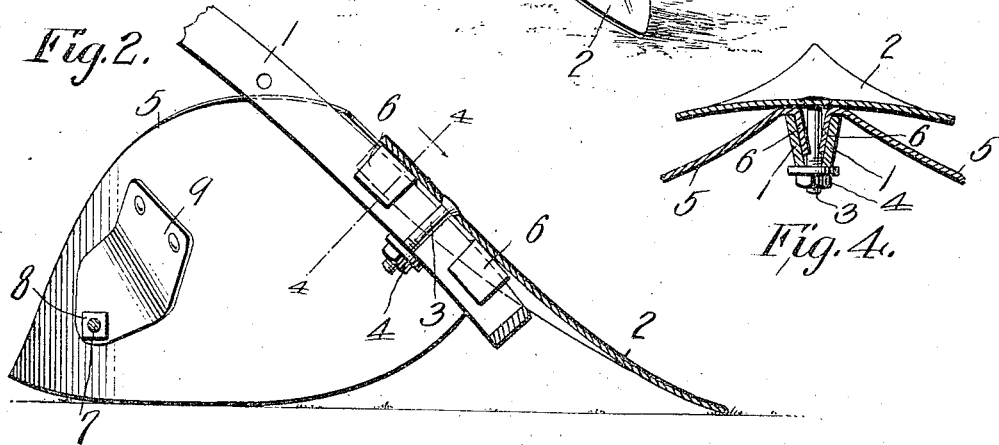
Fig. 4.
Fig. 3.
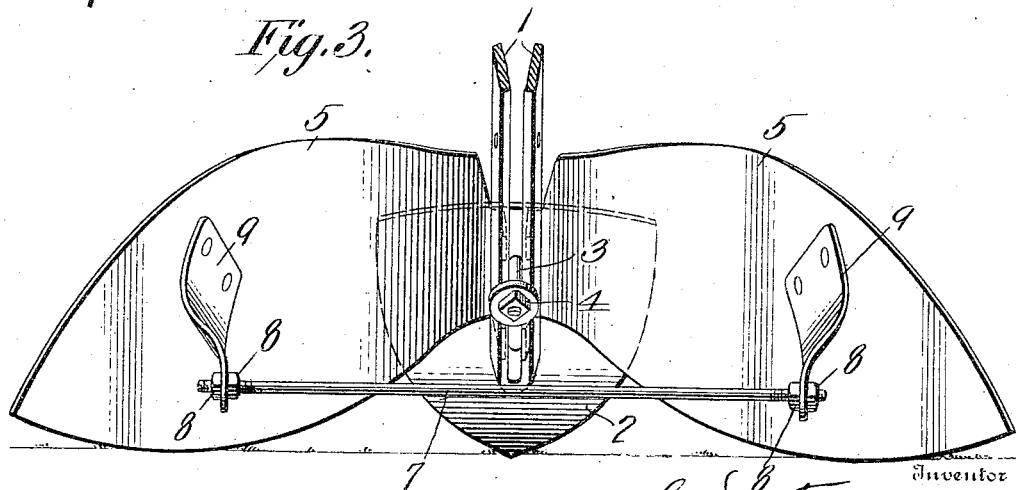
Witnesses
Oliver W. Holmes
N. J. Keim
Inventor
L. D. Flanary,
By Beeler & Robb
Attorneys

UNITED STATES PATENT OFFICE.

LORANZA D. FLANARY, OF LONG, OKLAHOMA.

LISTER FOR PLOWS.

No. 880,726.     Specification of Letters Patent.     Patented March 3, 1908.

Application filed October 31, 1907. Serial No. 399,977.

*To all whom it may concern:*

Be it known that I, LORANZA D. FLANARY, a citizen of the United States, residing at Long, Oklahoma, have invented certain new and useful Improvements in Listers for Plows, of which the following is a specification.

This invention consists of a lister for plows and the object of the invention primarily is to provide attaching means for making lists and the splitting of middles, adapted to be readily secured to an ordinary scooter plow, and which will be comparatively inexpensive and adapted for quick removal, in the actual use thereof.

The invention is designed particularly for listing ground for planting cotton or corn, and by reference to the following detail description the various advantageous features of construction and operation of the invention will be readily appreciated.

In the accompanying drawings, Figure 1 is a perspective view showing a plow foot having the invention applied thereto. Fig. 2 is a longitudinal vertical sectional view. Fig. 3 is a rear elevation, and Fig. 4 is a section taken about on the line 4—4 of Fig. 2.

Like reference characters refer to like parts throughout the description and drawings.

Referring specifically to the construction of the invention as presented in the drawings, the numeral 1 designates the plow foot or standard which consists of a U-shaped bar at the lower end of which is arranged the shovel 2. The above mentioned parts are of common construction such as used on plows of a well known type. The shovel 2 is secured to the plow foot or standard 1 by means of a fastening bolt 3 which passes through the upper portion of the shovel and the space between the sides of the standard 1, being held from displacement by means of a suitable nut 4.

The lister embodying the present invention comprises a pair of blades or wings 5 which curve upwardly, rearwardly and outwardly from the lower portion of the standard 1, and each of which is detachably secured to said standard by peculiar means now to be described. Each wing 5 is formed at its inner edge portion with downwardly projecting hooks 6, two of said hooks being preferably provided for each wing, though this is immaterial and any number may be employed within the contemplation of the invention. When the lister wings 5 are attached to the plow the inner body portions thereof are arranged beneath the shovel 2 and between said shovel and the plow standard 1. When arranged as above described the hooks 6 of the blades 5 engage over the opposite sides of the standard 1 firmly connecting the wings 5 with the plow. The fastening member 3 secures the shovel 2 to the standard 1 in a substantial manner, and at the same time said fastening constitutes means preventing displacement of the wings 5, as said wings are engaged and overlapped at the innermost portions by the shovel 2.

The wings 5 are connected at the outer rear portions thereof by means of an adjusting rod 7 threaded at its opposite ends to receive suitable adjusting nuts 8. The rod 7 is directly connected with spring plates 9, one of said plates being riveted or otherwise substantially secured to the rear side of each wing or blade 5. The nuts 8 at each end of the rod 7 are arranged at opposite sides of the plate 9 adjacent thereto and by proper movement of the nuts it will be observed that the rear end portions of the wings 5 may be moved toward or from one another and positively held at a desired adjustment in such movement.

By reason of the peculiar mounting of the blades 5 upon the standard 1, said blades may be readily secured in place or detached by operation of the fastening means 3 and 4. The coöperation of the fastening means for the shovel 2, and the shovel 2, with the wings or blades 5 is very clearly shown in Fig. 4 of the drawings. The means for connecting the wings 5 at the rear outer portions thereof reinforces or braces the wings in a desirable manner and furthermore the spring plates 9 included in such means permit of a certain amount of rearward movement of the wings should they strike an obstruction in the progress of the plow over the field.

Having thus described the invention what is claimed as new is:—

1. The combination with a plow embodying a foot or standard and a shovel mounted thereon, of a lister comprising oppositely extending wings carried by the foot, spring plates attached to the wings, and an adjusting rod adjustably connected at its opposite ends with the spring plates of the wings.

2. The combination with a plow embodying a standard consisting of a U-shaped bar, of a lister comprising oppositely extending wings mounted upon the standard, each wing being formed with spaced hooks projecting downwardly from its inner portion and engaging over a side of the U-shaped standard, a shovel arranged upon the standard so as to extend over the inner portions of the wings aforesaid, and a fastening member passing through the shovel and the space between the sides of the standard securing the shovel and wings thereto, said fastening member being located intermediate of the hooks of the wings as described.

3. The combination with a plow embodying a standard consisting of a U-shaped bar, of a lister comprising oppositely extending wings mounted upon the standard, each wing being formed with spaced hooks projecting downwardly from its inner portion and engaging over the side of the U-shaped standard, the shovel arranged upon the standard so as to extend over the inner portions of the wings aforesaid, a fastening member passing through the shovel and the space between the sides of the standard securing the shovel and wings thereto, said fastening member being located intermediate of the hooks of the wings as described, plates permanently secured at the upper ends thereof to the rear sides of the wings and have the lower portion thereof extending rearwardly and spaced from the wings, an adjusting rod disposed transversely of and in the rear of the wings, and adjusting nuts applied to the opposite ends of the adjusting rod and securing the plates together.

In testimony whereof I affix my signature in presence of two witnesses.

LORANZA D. FLANARY.

Witnesses:
WM. HOWELL,
J. F. MONTGOMERY.